(12) United States Patent
Ventura

(10) Patent No.: US 7,762,275 B1
(45) Date of Patent: Jul. 27, 2010

(54) VALVE STEM SHAFT HOUSING

(76) Inventor: Thomas Ventura, 7562 Ellis Ave., Unit G-5, Huntington Beach, CA (US) 92648

( * ) Notice: Subject to any disclaimer, the term of this patent is extended or adjusted under 35 U.S.C. 154(b) by 599 days.

(21) Appl. No.: 11/824,225

(22) Filed: Jun. 29, 2007

(51) Int. Cl.
*F16K 27/12* (2006.01)
(52) U.S. Cl. ....................................................... 137/382
(58) Field of Classification Search ................. 137/369, 137/377, 382
See application file for complete search history.

(56) References Cited

U.S. PATENT DOCUMENTS

| | | | |
|---|---|---|---|
| 1,266,246 A | 5/1918 | Fulton | |
| 1,357,463 A * | 11/1920 | McCarthy et al. | ........... 137/382 |
| 1,664,694 A | 4/1928 | Lovvorn | |
| 1,692,067 A | 11/1928 | Welsh | |
| 2,578,629 A | 12/1951 | Hartman | |
| 2,578,630 A | 12/1951 | Hartman | |
| 2,738,684 A | 3/1956 | Shafer | |
| 2,816,566 A | 12/1957 | Warren | |
| 2,890,710 A | 6/1959 | Hartman | |
| 2,934,036 A | 4/1960 | Anderson | |
| 2,964,969 A | 12/1960 | Eckert | |
| 2,973,774 A | 3/1961 | Clure | |
| 3,067,630 A | 12/1962 | Hartman | |
| 4,157,167 A | 6/1979 | Akkerman | |
| 4,187,870 A | 2/1980 | Akkerman | |
| 4,290,717 A * | 9/1981 | Aslen | ..................... 408/241 G |
| 4,407,324 A | 10/1983 | Caddell | |
| 5,340,078 A * | 8/1994 | Dean | .......................... 137/382 |
| 6,032,688 A | 3/2000 | Byars | |
| 6,971,401 B1 | 12/2005 | Carpenter | |

\* cited by examiner

*Primary Examiner*—John Fox
(74) *Attorney, Agent, or Firm*—Dennis W. Beech

(57) ABSTRACT

The present invention may be used to protect fluid flow valve stem shafts. A telescoping element may include a telescoping cover attached to a base. The base may have a bottom with a shaft aperture and an upstanding wall attached at a peripheral edge. A telescoping element housing may have a plurality of clips attached to a first end. The telescoping element housing may be inserted in the base with the clips engaging a plurality of apertures in the upstanding wall. A plurality of telescoping members may each have a lower outward extending flange and an upper inward extending flange and may be disposed in the telescoping element housing. A cap may be disposed in the telescoping members positioned for attachment to an upper end of a stem shaft.

8 Claims, 2 Drawing Sheets

VALVE STEM SHAFT HOUSING

BACKGROUND OF THE INVENTION

This invention relates to devices for protecting fluid flow valve stem shafts from environmental effects and for indicating valve position. The new housing device may expand and contract with the reciprocating motion of a stem shaft of a valve while protecting the stem shaft from the environment.

Various covers, housing, protectors, guards and the like may be known for covering or protecting a reciprocating stem shaft of a valve, for example, gate valves, sluice valves and the like. The reciprocating screw stem shaft generally does not rotate, but is extended and retracted by use of a hand wheel attached to a swivel nut that is internally threaded to engage the threads of the stem shaft. The hand wheel may be splined, keyed or otherwise structured to engage the swivel nut and a hand wheel nut may be threaded on the swivel nut to retain the hand wheel.

The swivel nut may be rotatably retained in a bearing attached to a yoke, strut or other wheel support structure positioned adjacent to a packing gland for the valve. The stem shaft may be exposed to the environment intermediate the swivel nut and the packing gland.

The housings for protecting reciprocating stem shaft exposure outward of a hand wheel may include generally rigid cylindrical housings that may have a longitudinal length sufficient to receive a fully extended stem shaft. The cylindrical housing may be opaque or transparent. In the case of a transparent housing, the valve position as determined by viewing the stem shaft may be determined. However, this assumes there is no reduced visibility through the housing that may be caused by the environment.

Other known housings may include flexible sleeves of resilient material that may have accordion or bellows side wall structure to allow extension and retraction with movement of a reciprocating stem shaft. Also, a helical wound guard sleeve, similar to a helical spring, may be known for guarding screws and rods of a valve. The helical guard sleeve may operate to expand and contract because of the spring quality of the guard, that is, the helical coil will be biased to contract to a flattened configuration. The helical coil guard may be expanded by the force of an extending stem shaft.

For installation between a bearing and a packing gland of a valve, a helical coil guard may require attachment at each end to remain in an extended position to cover that portion of a stem shaft. A sleeve may be known for covering a stem shaft in the area of a valve yoke. The sleeve may be generally cylindrical shape formed by two half shells fastened longitudinally. The sleeve may also be structured as two longitudinal elements comprising an outer and inner sleeve slidably nested together and held apart by a spring. No flanges may be necessary as the sleeve may be confined between the yoke bearing end and the packing gland of the valve.

SUMMARY OF THE INVENTION

The present invention is directed to devices that may protect fluid flow valve stem shafts. A telescoping element may include a telescoping cover attached to a base. The base may have a bottom with a shaft aperture and an upstanding wall attached at a peripheral edge. A telescoping element housing may have a plurality of clips attached to a first end. The telescoping element housing may be inserted in the base with the clips engaging a plurality of apertures in the upstanding wall. A plurality of telescoping members may each have a lower outward extending flange and an upper inward extending flange and may be disposed in the telescoping element housing. A cap may be disposed in the telescoping members positioned for attachment to an upper end of a stem shaft.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
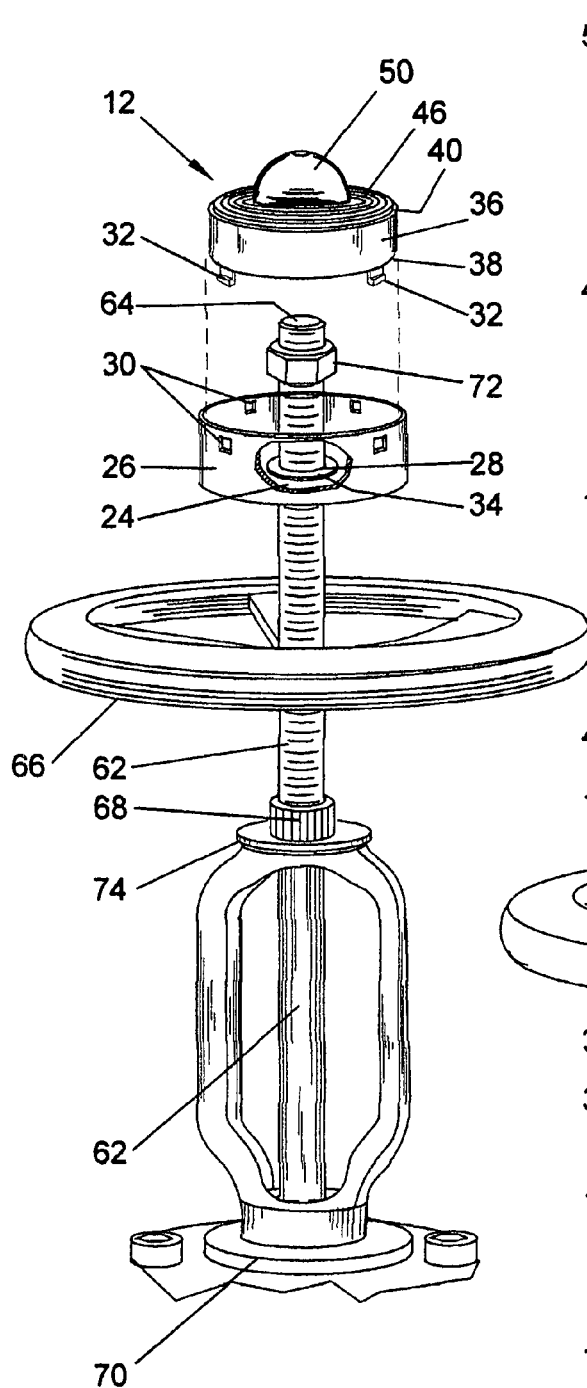
FIG. 1 illustrates an exploded perspective view of a housing according to an embodiment of the invention.
Figure 2:
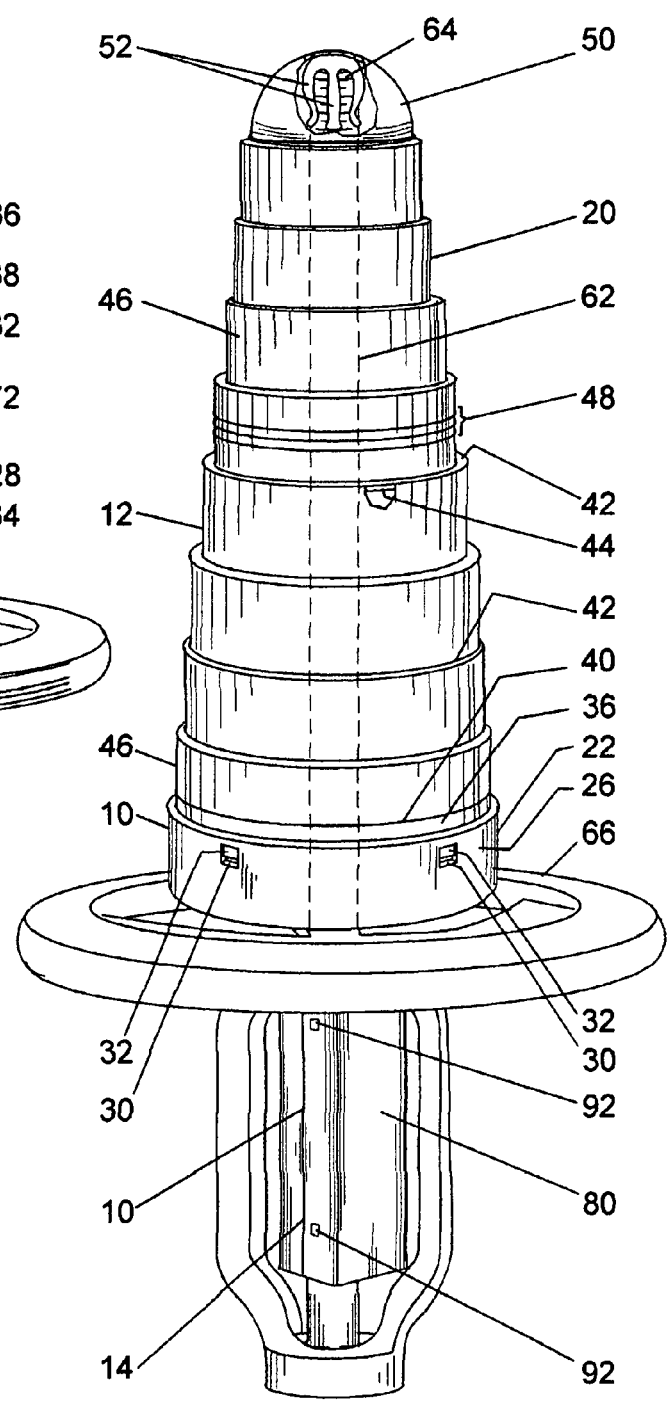
FIG. 2 illustrates an expanded perspective view of a housing according to an embodiment of the invention.
Figure 3:
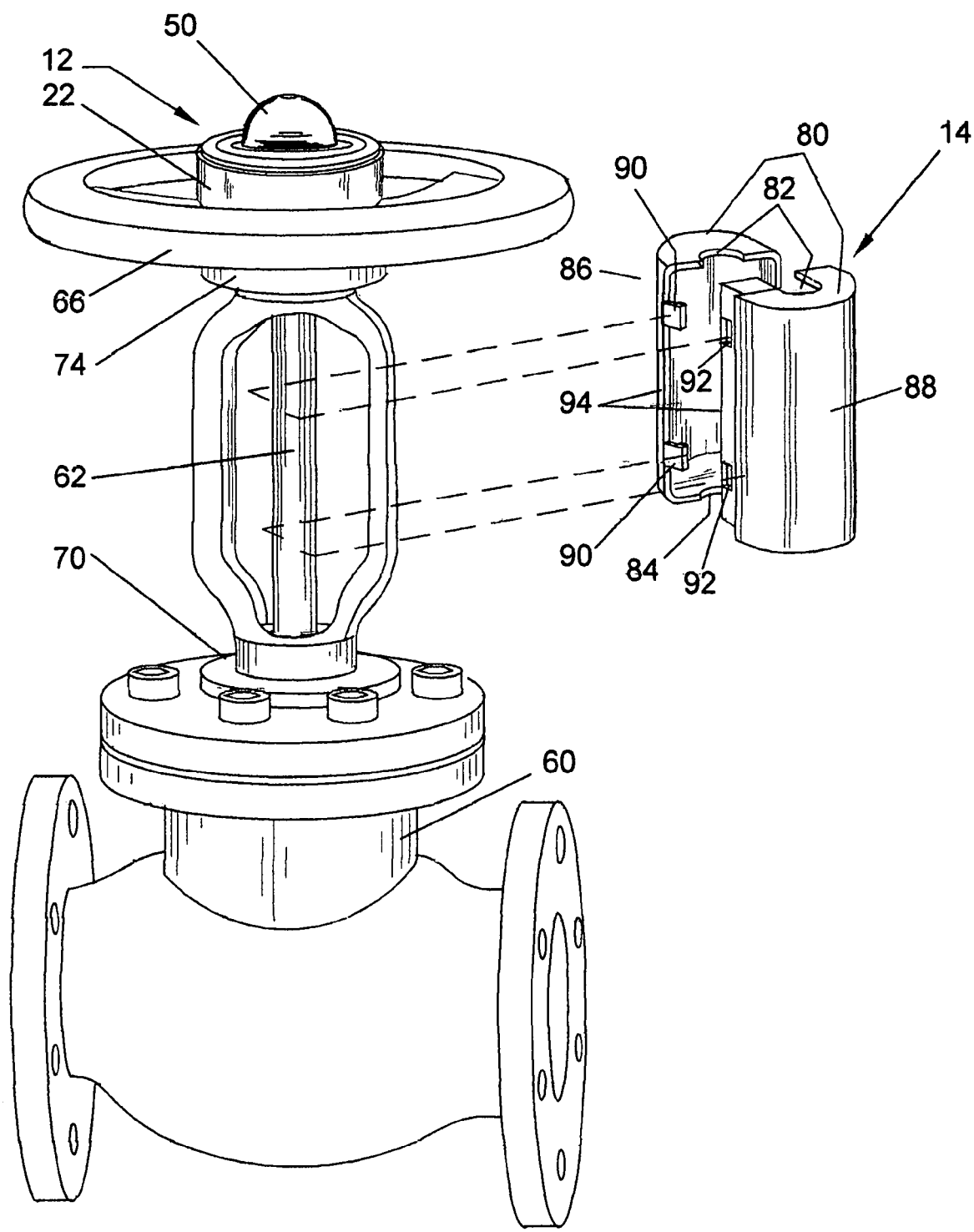
FIG. 3 illustrates a retracted perspective view of a telescopic element and an exploded view of an inner stem shaft element according to an embodiment of the invention.

Referring to FIGS. 1 through 3, a valve stem telescoping housing 10 may have a telescoping element 12 and an inner stem shaft element 14. The telescoping element 12 may include a telescoping cover 20 or shroud and a base 22. The base 22 may be a generally cylindrical tray shape with a circular bottom 24 and an upstanding circular wall 26 attached at a peripheral edge. The bottom 24 may have a shaft aperture 28 for insertion of a stem shaft 62 of a valve 60. There may be a durable washer 34, such as, a metal washer, attached adjacent the shaft aperture 28 to strengthen the bottom 24. The base 22 may be fastened to the hand wheel 66 and swivel nut 68 by the lock nut 72 that may normally secure the hand wheel 66.

The upstanding wall 26 may have a plurality of apertures 30 positioned for receipt of clips 32 that may be attached to a telescoping element housing 36. The telescoping element housing 36 may be a generally cylindrical shape structure with open ends. A first end 38 may have clips 32 protruding therefrom positioned to engage the apertures 30 when inserted in the base 22. Other types of fasteners may be used to engage receptors. A second end 40 of the telescoping element housing 36 may have an inward extending flange 42 to engage an outward extending flange 44 of an adjacent telescoping member 46. The telescoping members 46 may be slidably assembled as generally understood for such devices wherein the members 46 may be generally cylindrical in shape with a lower outward extending flange 44 and an upper inward extending flange 42. The number of telescoping members 46 used may depend on the extended length of the stem shaft 62 to be covered. The members 46 may have a flexible wall portion 48 that may be an elastic material, a bellows or accordion lapping structure, or the like to allow additional flexibility in expanding the telescoping element 12.

A cap 50 that may be a dome or partial spherical shape with an outward extending flange 44 may be slidable retained in the top most telescoping member 46. The cap 50 may have prongs 52, a threaded nut, a narrow interior opening, or the like to engage the upper end 64 of the stem shaft 62. The attachment of the cap 50 to the upper end 64 may allow the telescoping cover 20 to expand and retract as controlled by the movement of the stem shaft 62. The stem shaft 62 may not rotate when the hand wheel 66 and swivel nut 68 rotate thereby causing the base 22 to rotate while the cap 50 may remain fixed with the upper end 64. The nature of the telescoping cover 20 may allow telescoping members 46 and the cap 50 to rotate relative to each other to accommodate the rotation of the hand wheel 66.

The portion of the stem shaft 62 between a swivel nut 68 or bearing and a packing gland 70 of a valve 60 may be covered or enclosed with an inner shaft element 14. The inner shaft element 14 may be a generally rectangular box shape, a cylindrical shape or a multiface container shape with a top opening 82 and a bottom opening 84 to all the stem shaft 64 to reciprocate therethrough. The inner shaft element 14 enclosure 80 may be formed of two longitudinal members 86, 88 that may each be half of the enclosure circumference. A first longitudinal member 86 may have protruding clips 90 positioned to engage edge apertures 92 when the members 86, 88 may be forced together around a stem shaft 62.

The telescoping housing 10 may be constructed of plastic, metal or composite material depending on the operating environment of the valve and the cost. While the disclosure has used a gate valve illustrated with the stem shaft 62 in a vertical or elevation view, it will be appreciated that the telescoping housing 10 may be used for other types of valves that may have extending and receding valve stems and for valves having other positional orientations for example, horizontal or vertical.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device to protect fluid flow valve stem shafts comprising:
    a telescoping element including a telescoping cover attached to a base;
    said base has a bottom with a shaft aperture therein and an upstanding wall attached at a peripheral edge;
    a telescoping element housing having a plurality of fasteners attached to a first end is inserted in said base with said plurality of fasteners engaging a plurality of receptors in said upstanding wall;
    a plurality of telescoping members each with a lower outward extending flange and an upper inward extending flange disposed in said telescoping element housing having on a second end an inward extending flange; and
    a cap having an outward extending flange disposed in said plurality of telescoping members wherein said cap having an attachment device attachable to an upper end of a stem shaft.

2. The device as in claim 1 wherein said base has a washer disposed adjacent to said shaft aperture.

3. The device as in claim 1 wherein said plurality of telescoping members have a flexible wall portion.

4. The device as in claim 3 wherein said flexible wall portion is a bellows structure.

5. The device as in claim 1 wherein said base attachable to a hand wheel by a lock nut.

6. The device as in claim 1 wherein said bottom is generally circular in shape.

7. The device as in claim 1 further comprising;
    an inner shaft element including an enclosure with a top opening and a bottom opening;
    said enclosure formed as a first longitudinal member with a plurality of protruding fasteners on a first mating edge disposed to engage a second longitudinal member having a plurality of edge receptors therein adjacent a second mating edge; and
    said inner shaft element disposable between a swivel nut bearing and a valve packing gland.

8. The device as in claim 1 wherein said fasteners are clips and said base has a plurality of apertures therein as said receptors.

* * * * *